Dec. 10, 1968     O. W. MOJONNIER     3,415,136
LINK CHAIN
Filed March 13, 1967
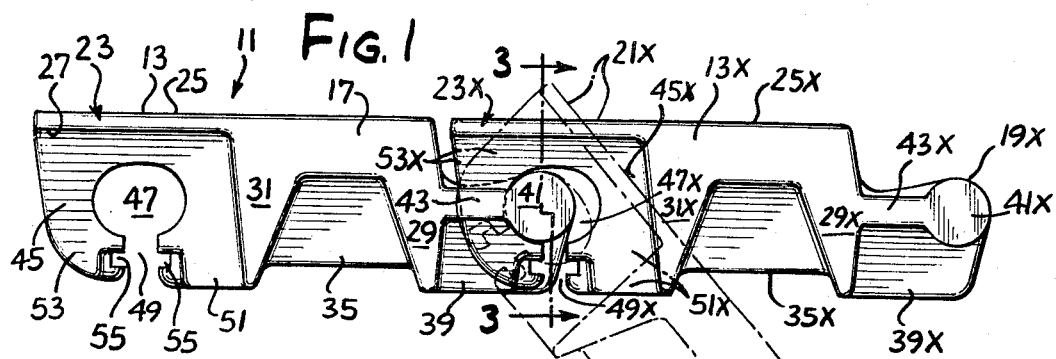
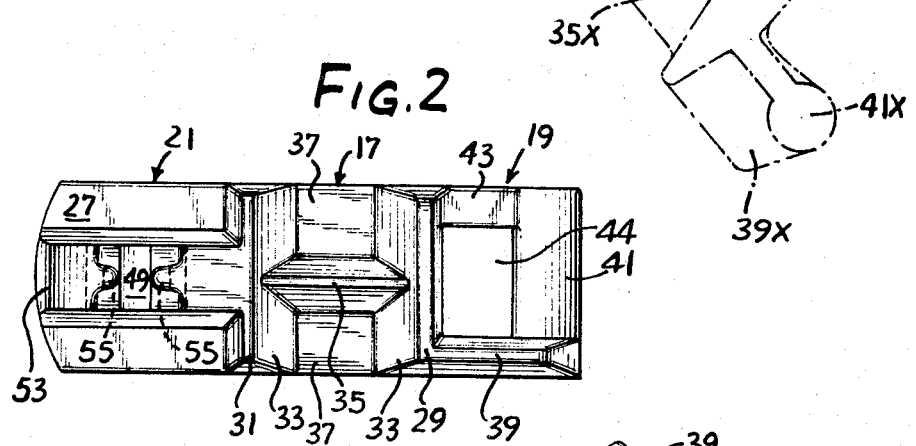
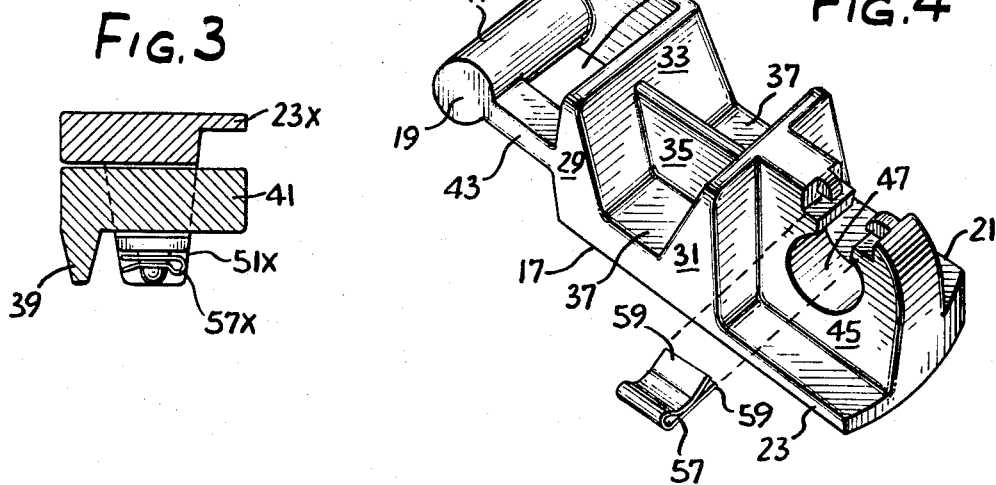
INVENTOR
OLIVER W. MOJONNIER

United States Patent Office 3,415,136
Patented Dec. 10, 1968

3,415,136
LINK CHAIN
Oliver W. Mojonnier, 522 Monroe Ave.,
River Forest, Ill. 60305
Filed Mar. 13, 1967, Ser. No. 622,527
1 Claim. (Cl. 74—249)

ABSTRACT OF THE DISCLOSURE

Adjoining rockably associated links with male and female releasably interconnected portions are assembled and disconnected by conditioning the links for movement in a direction other than their rocking plane. A removable gate prohibits disconnection of adjoining links by precluding relative movement in a disconnection direction while permitting relative rocking thereof.

---

The present invention relates to link chain construction. Particularly the invention relates to a link chain which comprises rockably associated links with interlocking male and female portions arranged for unlocking by relative adjustment of said links to a selected aspect.

A chain of the character with which the present invention concerns itself comprises a plurality of substantially like links. Each thereof comprises a body having a male portion and a female portion, proportioned and arranged so that a male portion of one link and a female portion of an adjoining link can be releasably interlocked to form a link chain. A link chain according to said invention distinguishes from link chains of another type having adjoining links which are connected together by fasteners, such as rivets. The latter chains are undesirable if chain disassembly is a significant consideration, as for example when frequent chain repairs are anticipated, because said fasteners preclude easy chain disassembly.

A link chain according to the present invention has individual link members which are articularly interconnected for relative rocking movements in an operative plane, and which may be disconnected by relatively positioning adjoining links at a generally non-normal aspect for operation and then moving the link members apart in a plane at right angles to said operative plane. A link chain of the general character of the present invention may be constructed of links according to U.S. Patent 3,160,024, issued Dec. 8, 1964.

While the latter type of chain is highly desirable because of its facility of link disassembly, that characteristic may be also disadvantageous if the chain in normal use tends to assume an aspect from which adjoining links are separable.

It is an object of the present invention to preclude accidental or undesired separation of adjoining links in a link chain of the indicated class.

In accordance with the present invention, and as a feature thereof, locking means are removably mounted in association with adjoining and interconnected links in a manner such that they may be readily assembled into a chain and, after assembly, they are precluded from disassembly while said locking means are operative. The character of the locking means is such that they are readily removable so that adjoining links may be quickly restored to a condition permitting rapid separation.

The foregoing and other objects, features, and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a side elevational view of a chain comprising a pair of connected together like fashioned links conforming to the present invention and illustrating in phantom lines an alternate link condition during chain assembly, a gate having been omitted for clarity.

FIG. 2 is a view looking at the bottom of the left link shown in FIG. 1.

FIG. 3 is a cross sectional view taken substantially on the line 3—3 of FIG. 1 and looking in the direction of the arrows, said gate being included.

FIG. 4 is a perspective view of the link shown in FIG. 2 with said gate being shown in exploded relationship.

Referring now more particularly to FIG. 1, a link chain 11 is shown comprising a pair of adjoining interconnected links 13. Said links 13 may be of conventional metal fabrication, and most economically are forged by means well known in the art. Link 13, as in the illustrated embodiment, may be of substantially identical construction, and, therefore, similar reference numerals are applied to corresponding parts of each of said links. However, the parts and structural components of the link to the right in FIG. 1 and said last link itself are further identified by the letter "X" for a reason to become apparent in the ensuing description.

Each link comprises a body which is divided into three general parts as follows: a medial portion generally identified by numeral 17, a male portion generally identified by numeral 19, and a female portion generally designated by numeral 21. Male portion 19 and female portion 21 are disposed on opposite sides of medial portion 17. Portions 17, 19 and 21 may be of substantially equal lengths. Male portion 19 and female portion 21 preferably are of equal length for reasons to become apparent in the ensuing description.

For the purpose of orientation and facility of description, "forward" when used herein refers to the relative direction of male portion 19, and "backs" or "rearward" when used in this description refers to the relative direction of female portion 21.

In the present embodiment, each link comprises a cover or top generally designated 23 and defined by an upper flap or weight-bearing surface 25 and a lower surface 27. Cover 23 is preferably in the shape of an elongated oval from which approximately an end third has been removed, and said cover extends over substantially all of the female part 21 and the medial part 17 from side to side of its link.

Medial portion 17 is defined by a pair of walls 29 and 31 which are spaced apart from each other and at opposite ends of medial portion 17. Said walls, respectively, define male portion 19 and female portion 21 and extend from side to side of their link. Each of the walls 29 and 31 extends downwardly from its cover 23 to the bottom of its link and presents an inner outwardly and downwardly sloping flat or surface 33.

A generally centrally positioned divider or web 35 is fashioned between surfaces 33 of each associated pair of walls 29 and 31. The opposite ends of divider 35 are integral or connected with walls 29 and 31 and thereby generate a pair of sprocket chambers 37 on opposite sides of web 35 between surfaces 33. Chambers 37 are arranged and proportioned so that when chain 11 is in normal use it will be driven by a conventional sprocket wheel (not shown) of a doubled or paired tooth type, with each associated pair of teeth engaging on opposite sides of a divider 35. Sloping of walls 33 facilitates entry and removal of the sprocket teeth (not shown) as a link 13 is driven or pulled.

Male portion 19 comprises a side wall 39 and a post or male element 41 which extends normally from side wall 39. The longitudinal axis of post 41 extends from side to side, with its left end integral with, connected to or supported by side wall 39. Post 41 is illustrated herein as circular in cross section.

Post 41 is substantially centrally disposed with respect to the top and bottom of its link. A web 43 connects the right side portion of post 41 to a medial section of the right side portion of wall 29. The foregoing construction generates a tunnel 44 which is defined by post 41 at the front, wall 29 at the rear, web 43 and side wall 39 at the left and right sides, respectively. Tunnel 44 is open and extends from top to bottom of male portion 19.

Female portion 21 extends rearwardly from the rear surface of wall 31. A web which is disposed medially of female portion 21 is fashioned as a clevis 45. At its upper end, clevis 45 is integral with or suitably connected to cover 23 along the entire length thereof which is disposed over female portion 21. The forward portion of clevis 45 is secured to the rear surface of wall 31. Clevis 45 has a preferably ovoid generally centrally disposed opening or aperture 47 which extends from side to side through said clevis. An aisle 49 which extends from side to side through clevis 45 provides a downward passage which communicatively connects opening 47 with the outside.

The minimum diameter of opening 47 is slightly larger than the diameter of post 41. The length of aisle 49 from front to back is substantially the same as the width of web 43. The arrangement of the foregoing components of female portion 21 provides in clevis 45 a pair of arms 51 and 53. Arm 51 is the forward arm, and arm 53 is the rearward arm and defines the rear of its link, and, as illustrated, extends in a curved path. Arms 51 and 53 are separated from each other at the bottom side of their link by aisle 49.

Each of arms 51 and 53 is fashioned with a slot or recess 55 which opens into its associated aisle 49. Slots 55 of each link are aligned in substantially parallel relationship to top 23 of their link to form a keyway. A gate 57 (FIG. 4) is removably mountable in each associated pair of slots 55 for the purpose of closing aisle 49. Most practical for gate 57 is a wide cotter key fashioned with a pair of bendable legs which may be spread once gate 57 is in assembled position so that said gate may not be removed accidentally.

To assemble the chain, a first link 13 is placed upon its left side so that its right side is facing upwardly. Aisle 49 is directed toward the assembler with top or cover 23 facing away from the assembler. In such position, the longitudinal axis of male element or post 41 extends vertically.

A second link 13X is then gripped and disposed at approximately right angles to but above link 13. Its top or cover 23X is disposed to the right with aisle 49X in vertical alignment with web 43. Accordingly, opening 47X is brought into vertical alignment with post 41. From such position, link 13X is then merely dropped straight down and web 43 will pass through aisle 49X. Relative movement is stopped by engagement of web 45X with side 39. At that time, arm 53X will then be below the level of web 43. In such position, links 13 and 13X are disposed at right angles and in what is considered a separable aspect from which they can be readily separated by relative movement in a direction opposite to that heretofore described for commencement of assembly.

By rotation from the aforestated separable aspect in a manner such that link 13X is rotated counterclockwise with respect to link 13, arm 53X becomes positioned in and partially through tunnel 44. Such partially rotated position is shown in dotted line in FIG. 1. Upon further counterclockwise rotation of link 13X, said links can be conditioned as shown in solid lines in FIG. 1. The limits of relative rotation will occur as a result of engagement of the rear end portion of the top or cover 23X with the forward end of cover 23 or the forward surface of wall 29. In such position, adjacent links 13 and 15 will be in a substantially straight line.

From the foregoing, it is seen that the portion of cover 23X which covers the female portion 21X also covers male portion 19 when chain 11 is assembled in a straight line. Accordingly, an almost continuous cover is provided over said chain, except, of course, there will be a small separation of the covers 23 and 23X between adjacent links because of the play permitted by the shape of opening 47X.

It is appreciated that the diameter of post 41 is greater than aisle 49X. While this proportioning will ordinarily keep adjacent links 13 and 13X from coming apart, occasionally during normal operation adjacent links may assume a relative angular disposition of approximately 90° each to the other so that they will be in a separable condition. A gate 57 when positioned in keyway 55X serves to prohibit separation of the links. By fashioning gate 57 as a cotter key, said gate can be wedged into keyway 55X and with securance insured by spring legs 59. The latter can be bent to preclude displacement of said gate from the chain. Return bending will permit easy removal of said gate to facilitate chain disassembly when desired.

As many substitutions or changes could be made in the above described construction, and as many apparently widely different embodiments of the invention within the scope of the claim could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. In a link chain having a plurality of link members with opposed first and second end sections articulately connected together in operative aspect, said chain defined by: a first link with a male portion at its first end section, said male portion including a post and a web normal thereto; a second link with a female portion at its second end section; said female portion including a pair of arms with spaced apart end portions generating therebetween a gap, said arms being arranged about said post for relatively rocking said first and second links between said operative aspect and an interconnected but separable aspect and also for relatively moving said first and second links from a disconnected condition to said separable aspect, the gap between the end portions of said arms proportioned to pass said web to disconnect said first and second links upon movement thereof transversely of said chain, and a key frictionally and releasably retained in said spaced apart end portions across and for blocking said gap to prevent relative movement of said first and second links from separable aspect to disconnected condition while permitting relative rocking thereof, said key being withdrawable from said arms transversely of said chain.

References Cited

UNITED STATES PATENTS

| | | | |
|---|---|---|---|
| 393,992 | 12/1888 | Locke | 74—248 |
| 2,317,769 | 4/1943 | Holmes | 74—249 |
| 2,530,014 | 11/1950 | Holmes | 74—249 |
| 2,547,581 | 4/1951 | Kearns | 74—249 |
| 2,853,887 | 9/1958 | Johnson | 74—250 |
| 3,160,024 | 12/1964 | Mojonnier | 74—249 |

FRED C. MATTERN, JR., *Primary Examiner.*

JAMES A. WONG, *Assistant Examiner.*

U.S. Cl. X.R.

74—250